Aug. 12, 1930. W. E. VER PLANCK 1,773,067
METHOD OF SEALING SHAFT PACKINGS
Filed Jan. 27, 1928
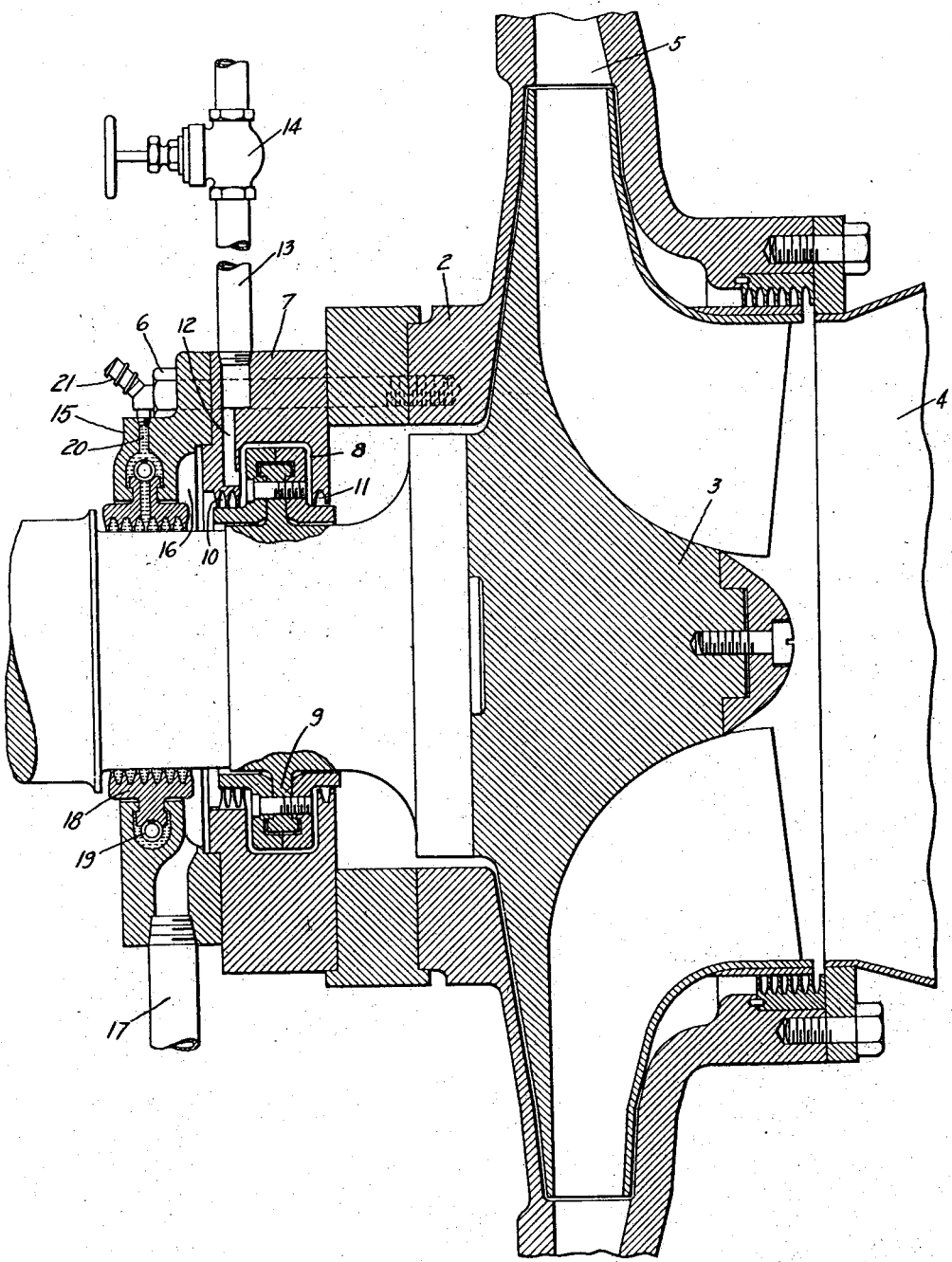
Inventor:
William E. Ver Planck,
by Charles E. Tullar
His Attorney.

Patented Aug. 12, 1930

1,773,067

UNITED STATES PATENT OFFICE

WILLIAM E. VER PLANCK, OF SALEM, MASSACHUSETTS, ASSIGNOR TO GENERAL ELECTRIC COMPANY, A CORPORATION OF NEW YORK

METHOD OF SEALING SHAFT PACKINGS

Application filed January 27, 1928. Serial No. 250,055.

The present invention relates to shaft packings such as are utilized for preventing leakage between a rotating shaft and the surrounding casing wall through which the shaft projects.

In connection with such shafts, it is desirable for certain applications to provide not only a sealing means for the shaft packing to prevent leakage when the shaft is rotating but also a sealing means to prevent leakage when the shaft is stationary. One such application is in connection with centrifugal compressors used for handling gas, it being desirable in such cases to seal the shaft packing when the compressor is not running to prevent leakage of gas into the compressor room.

The object of my invention is to provide an improved method of sealing a shaft packing, and for a consideration of what I believe to be novel and my invention, attention is directed to the accompanying description and the claims appended thereto.

In the drawing, the figure is a sectional view of a shaft sealing structure embodying my invention, the same being shown applied to a centrifugal compressor.

Referring to the drawing, 1 indicates a shaft projecting through an opening in a casing wall 2 and between which shaft and the opening it is desired to prevent leakage both when the shaft is rotating and when it is stationary. Shaft 1 is shown as being the shaft of a centrifugal compressor, 3 being an impeller carried by the shaft, 4 the inlet to the impeller, and 5 the discharge ring.

Connected to wall 2 by bolts 6 is an annular housing 7 having an annular chamber 8 in which an impeller 9 carried by shaft 1 runs. On opposite sides of the impeller are toothed packing means 10 and 11, and connected with the chamber by a conduit 12 is a sealing liquid supply pipe 13. In pipe 13 is a suitable control valve 14 for regulating the supply of sealing liquid to the impeller housing.

The construction so far described is a known form of liquid sealed packing, the operation of which is well understood by those familiar with packings. It provides a tight seal when the shaft is rotating, but does not seal when the shaft is stationary. The sealing liquid used ordinarily is water.

Adjacent housing 7 and fixed to it by bolts 6 is a wall 15 which defines with the outer side of housing 7 an annular leakage chamber 16 from which sealing liquid leaking past packing 10 is carried away by a drain pipe 17.

Carried by wall 15 and located between it and shaft 1 is a toothed or labyrinth packing 18 of suitable construction, the usual spring for holding it positioned being indicated at 19.

According to my invention, I seal the packing against leakage when the shaft is stationary by filling the grooves of one of the toothed or labyrinth packings with a substance which is normally semi-solid and which will pack against the shaft tightly. I utilize a substance which is soluble in or is capable of being washed away by the sealing liquid so that when the machine is running the substance will be removed from between the teeth of the packing. As stated above, water is the sealing liquid used ordinarily and in this case I may with advantage use ordinary soap for the sealing substance. Soap has the advantage of being low in cost, easy to use, and readily soluble in water.

In the present instance I have shown the sealing means as being applied to or arranged for use with the toothed or labyrinth packing 18. In wall 15 and packing member 18, I provide a passage 20 leading to the teeth of the packing member and at the outer end of the passage I provide a suitable fitting 21 to which a tool may be attached for forcing sealing substance into the spaces between the teeth of the packing member. As a tool for use in forcing sealing substance into the packing I may use what is known as a "pressure gun", which may comprise, as is well known, a cylinder having means at one end for connection to fitting 21 and a piston by means of which a substance in the cylinder may be forced out.

When the shaft is rotating, that is, when the machine is running, the shaft packing is sealed by the liquid packing comprising impeller 9 in the known manner. When the machine is to be stopped, the spaces between the teeth of packing 18 are filled with the sealing substance, the substance being injected into the spaces in the manner already described. This may be done either before or after the machine is stopped but preferably I do it just before. This serves to seal the shaft packing while the machine is idle. When the machine is started up again and the liquid packing is put into operation, the leakage from the liquid packing dissolves or washes the sealing substance from the spaces between the packing teeth and thus prevents hardening of it in the grooves of the labyrinth. This is of especial importance where soap is used as the sealing substance since if the soap were left in the grooves of the labyrinth it would harden in them and thus tend to render sealing of the packing difficult to effect.

What I claim as new and desire to secure by Letters Patent of the United States is:—

1. The method of sealing a shaft packing comprising a liquid sealing means and a labyrinth sealing means when the shaft is stationary which comprises filling the grooves of the labyrinth sealing means with a semi-solid substance and dissolving said semi-solid substance with the liquid of the liquid sealing means when the same is put into operation.

2. The method of sealing a shaft packing comprising a water sealing packing and a labyrinth packing when the shaft is stationary which comprises filling the grooves of the labyrinth packing with soft soap and dissolving said soap with the water supplied to the water sealing packing when the same is put into operation.

In witness whereof, I have hereunto set my hand this 25th day of January, 1928.

WILLIAM E. VER PLANCK.